United States Patent
Shouji

(10) Patent No.: US 9,575,403 B2
(45) Date of Patent: Feb. 21, 2017

(54) ILLUMINATION OPTICAL SYSTEM, PROJECTOR, AND PROJECTOR SYSTEM

(75) Inventor: Eisaku Shouji, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 52 days.

(21) Appl. No.: 14/420,934

(22) PCT Filed: Aug. 21, 2012

(86) PCT No.: PCT/JP2012/071042
§ 371 (c)(1),
(2), (4) Date: Feb. 11, 2015

(87) PCT Pub. No.: WO2014/030206
PCT Pub. Date: Feb. 27, 2014

(65) Prior Publication Data
US 2015/0219985 A1  Aug. 6, 2015

(51) Int. Cl.
*G03B 21/20* (2006.01)
*G02B 27/09* (2006.01)
(Continued)

(52) U.S. Cl.
CPC ......... *G03B 21/208* (2013.01); *G02B 27/0955* (2013.01); *G02B 27/141* (2013.01);
(Continued)

(58) Field of Classification Search
CPC .......... G03B 21/14; G03B 21/00; F03B 21/20; G02B 27/09; G02B 27/14
See application file for complete search history.

(56) References Cited

U.S. PATENT DOCUMENTS

| 2003/0151834 A1* | 8/2003 | Penn | G02B 5/04 |
| | | | 359/833 |
| 2006/0170884 A1* | 8/2006 | Liu | G03B 21/28 |
| | | | 353/100 |
| 2012/0092624 A1* | 4/2012 | Oiwa | G02B 27/48 |
| | | | 353/31 |

FOREIGN PATENT DOCUMENTS

| CN | 1112802 A | 11/1995 |
| CN | 101903821 A | 12/2010 |

(Continued)

OTHER PUBLICATIONS

Chinese Office Action dated Sep. 15, 2015 with an English translation thereof.
(Continued)

*Primary Examiner* — Sultan Chowdhury
*Assistant Examiner* — Danell L Owens
(74) *Attorney, Agent, or Firm* — McGinn IP Law Group, PLLC

(57) ABSTRACT

An illumination optical system is provided with: a lens that condenses first luminous flux emitted from an optical fiber at an angle of divergence of $\theta 1$; a lens that condenses second luminous flux that has a color that is different from the color of the first luminous flux and that is emitted from an optical fiber at an angle of divergence of $\theta 2$ ($\neq \theta 1$); and a dichroic mirror that is provided at the position at which the optical axis of the lens intersects at a right angle with the optical axis of the lens, that transmits the first luminous flux that is irradiated from the lens, and that reflects the second luminous flux that was irradiated from the lens in the direction in which the first luminous flux was transmitted.

10 Claims, 3 Drawing Sheets

(51) Int. Cl.
*G02B 27/14* (2006.01)
*G03B 21/00* (2006.01)

(52) U.S. Cl.
CPC ..... *G03B 21/2013* (2013.01); *G03B 21/2033* (2013.01); *G03B 21/005* (2013.01)

(56) References Cited

FOREIGN PATENT DOCUMENTS

| JP | 07-151995 A | 6/1995 |
|----|-------------|--------|
| JP | 08-314033 A | 11/1996 |
| JP | 2008-256979 A | 10/2008 |
| JP | 2009-266463 A | 11/2009 |
| JP | 2010-014815 A | 1/2010 |
| JP | 2011-048021 | 3/2011 |
| JP | 2011-102901 | 5/2011 |

OTHER PUBLICATIONS

Japanese Office Action dated Dec. 1, 2015, with partial English translation thereof.
International Search Report (ISR) (PCT Form PCT/ISA/210), in PCT/JP2012/071042, dated Oct. 23, 2012.

\* cited by examiner

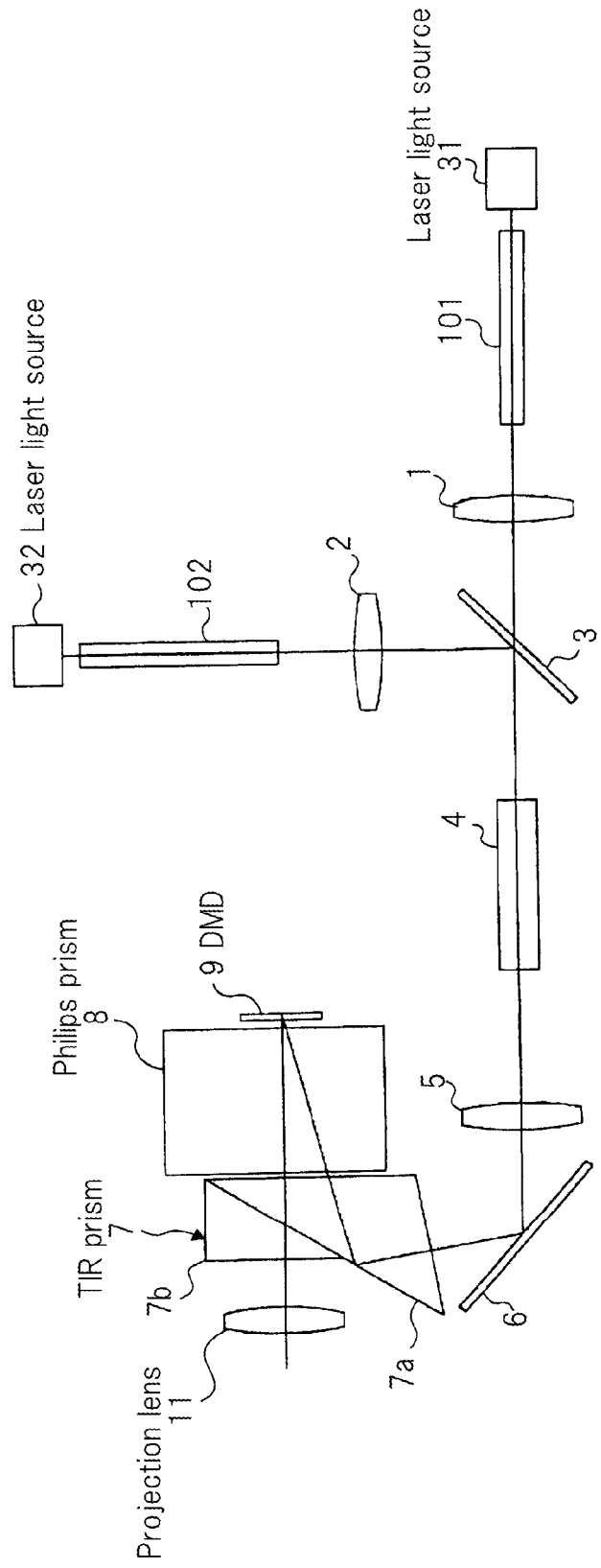

ILLUMINATION OPTICAL SYSTEM, PROJECTOR, AND PROJECTOR SYSTEM

TECHNICAL FIELD

The present invention relates to the illumination optical system of a projector.

BACKGROUND ART

An illumination optical system that uses a rod integrator to obtain uniform illumination light is a known illumination optical system for a projector.

Patent Document 1 describes a DLP (Digital Light Processing) projector provided with this type of illumination optical system.

The above-described DLP projector includes first to third laser array light sources having substantially identical angles of divergence, an illumination optical system, a Total Internal Reflection (TIR) prism, a display element composed of a Digital Micromirror Device (DMD), and a projection lens.

Here, the angle of divergence is an angle that is twice the angle formed by the outermost light ray and the center light ray (half-angle of divergence) when divergent luminous flux is viewed from a direction perpendicular to the plane that contains the center light ray of the divergent luminous flux.

The first laser array light source emits red laser light, the second laser array light source emits green laser light, and the third laser array light source emits blue laser light.

The illumination optical system includes first to third reflecting mirrors, first and second dichroic mirrors, a concave lens, a rod integrator, and a relay optical system.

The rod integrator is composed of, for example, a glass body in the shape of a quadrangular prism. One of the two end surfaces of the rod integrator is the incident surface, and the other is the exit surface.

In the rod integrator, luminous flux that entered the incident surface is propagated within the rod while being repeatedly reflected by the inner surfaces of the rod and then exits from the exit surface. The multiple reflections in the process of being propagated within the rod make the luminance of the incident luminous flux uniform. At the exit surface of the rod, a plurality of two-dimensional light source images are produced in matrix form depending on the number of reflections.

A concave lens, first dichroic mirror, second dichroic mirror, and first reflecting mirror are arranged in that order from the exit surface of the rod integrator.

The first reflecting mirror reflects the blue laser light from the third laser array light source toward the second dichroic mirror. The second dichroic mirror reflects the green laser light from the second laser array light source toward the second dichroic mirror.

The second dichroic mirror has spectral reflection properties that enable transmission of light of the blue wavelength band and reflection of light of the green wavelength band. Blue laser light from the first reflecting mirror is transmitted by the second dichroic mirror and irradiated into the first dichroic mirror. Green laser light from the second reflecting mirror is reflected by the second dichroic mirror, and this reflected light is irradiated into the first dichroic mirror on the same optical path as the blue laser light.

The third reflecting mirror reflects the red laser light from the first laser array light source toward the first dichroic mirror.

The second dichroic mirror has spectral reflection properties that enable transmission of light of the blue wavelength band and light of the green wavelength band and reflection of light of the red wavelength band. The blue laser light and green laser light from the second dichroic mirror are transmitted though the first dichroic mirror and irradiated into the concave lens. The red laser light from the third reflecting mirror is reflected by the first dichroic mirror, and this reflected light is irradiated into the concave lens on the same optical path as that of the blue and green laser light.

The concave lens acts to disperse the red, green, and blue laser light from the first dichroic mirror. The red, green, and blue laser light from the concave lens is entered into the rod integrator from the incident surface of the rod.

The relay optical system is arranged on the exit surface side of the rod integrator. The relay optical system acts to form an image of the light source image that was formed on the exit surface of the rod integrator on the effective display region of the display element.

The TIR prism is provided between the relay optical system and the display element. The luminous flux from the relay optical system is irradiated into the display element by way of the TIR prism. The display element spatially modulates the luminous flux to form image light. The image light that is formed by the display element is irradiated into the projection lens by way of the TIR prism.

In the above-described illumination optical system, the optical path lengths of the laser light of each color from each laser array light source to the incident surface of the rod integrator are the same, and the angles of divergence of each laser array light source are also the same. As a result, the laser light of each color that is emitted from each laser array light source is entered into the rod integrator with the same angle of divergence, is propagated within the rod, and is then exited from the rod integrator with the same angle of divergence.

Because the angle of divergence of the laser light of each color that is exited from the rod integrator is the same, the irradiation ranges of the laser light of each color that is irradiated on the display element by way of the relay optical system also coincide. As a result, the irradiation range of the laser light of each color can be caused to coincide with the effective display region on the display element by appropriately setting the magnification of the relay optical system.

Recent projectors include projectors in which laser light is supplied from an external light source device to the illumination optical system by way of optical fiber.

An external light source is provided with a red laser light source, a green laser light source, and a blue laser light source. The green laser light and blue laser light are supplied to the illumination optical system by a first optical fiber. The red laser light is supplied to the illumination optical system by a second optical fiber.

The angles of divergence of each of the green laser light and blue laser light that are emitted from the first optical fiber are substantially identical. The angle of divergence of red laser light emitted from the second optical fiber differs from the angle of divergence of the green laser light and blue laser light.

When the above-described external light source device is applied to the DLP projector described in Patent Document 1, the illumination optical system is configured such that green and blue laser light that is emitted from a first optical fiber is entered into one of the surfaces of a second dichroic mirror, and red laser light emitted from a second optical fiber is entered into the other surface of the second dichroic mirror.

The red laser light and the green and blue laser light are synthesized by the second dichroic mirror and then irradiated into the rod integrator by way of the concave lens.

LITERATURE OF THE PRIOR ART

Patent Documents

Patent Document 1: Japanese Unexamined Patent Application Publication No. 2008-256979

SUMMARY OF THE INVENTION

In the system described in Patent Document 1, the following problems occur when applying the above-described external light source device.

In the rod integrator, if the angle of incidence is within a range that is less than or equal to the maximum angle of incidence at which total reflection occurs within the rod, the number of multiple reflections inside the rod typically increases as the angle of incidence increases, whereby the effect of making luminance uniform also increases. The rod integrator thus has the property in which the degree of uniformity of luminance depends on the angle of incidence.

In the system described in Patent Document 1 in which an external light source device is applied, of the laser light that enters the rod integrator, the angle of divergence of red laser light differs from the angle of divergence of the green and blue laser light. As a result, the degree of uniformity of luminance in the rod integrator differs for the red laser light and the green and blue laser light due to the property described above. This difference in the degree of uniformity of luminance appears as color irregularity on the screen and thus gives rise to the problem of degradation of image quality.

Red laser light and green and blue laser light in which the angles of divergence differ are irradiated to a display element by way of the same relay optical system, and this means that the ranges of irradiation by the laser light differ.

If the laser light for which the angle of divergence is smallest is taken as a reference and the relay optical system designed such that the illumination range of the laser light that was taken as a reference coincides with the effective display region of the display element, a portion of the laser light for which the angle of divergence is larger will diverge from the effective entrance pupil of the relay optical system. The luminous flux that diverges from this effective entrance pupil does not contribute to image display and therefore gives rise to the problems in which there is a decrease in light utilization efficiency and a reduction in the luminance of the screen.

On the other hand, if the laser light for which the angle of divergence is greatest is taken as the reference and the relay optical system is designed such that the irradiation range of the laser light that is taken as a reference coincides with the effective display region of the display element, the irradiation range of the laser light for which the angle of divergence is smaller will be smaller than the effective display region and therefore fail to illuminate the entire effective display region. Because an image cannot be displayed in regions that are not illuminated by the laser light, the problem arises that the image quality will be degraded.

It is an object of the present invention to provide an illumination optical system, a projector, and a projector system that can reduce the occurrence of color irregularities, a decrease in screen luminance, and a reduction of image quality.

According to one aspect of the present invention for achieving the above-described object, an illumination optical system is provided that includes:

a first lens that condenses first luminous flux that is emitted from a first optical fiber with a first angle of divergence;

a second lens that condenses second luminous flux that has a color that is different from a color of the first luminous flux and that is emitted from a second optical fiber with a second angle of divergence that differs from the first angle of divergence; and a synthesizing optical element that is provided at a position at which the optical axis of the first lens intersects with the optical axis of the second lens at a right angle, that transmits the first light beam from the first lens, and that reflects the second light beam from the second lens in the direction that the first light beam was transmitted;

wherein the first and second lenses are configured such that the convergent angle of the first light beam that was condensed by the first lens matches with the convergent angle of the second light beam that was condensed by the second lens.

According to another aspect of the present invention, a projector is provided that includes: the above-described illumination optical system;

display means that spatially modulates luminous flux from the illumination optical system to form image light; and a projection lens that projects the image light that was formed by the display means.

According to another aspect of the present invention, a projector is provided that includes:

the above-described illumination optical system;

color separation means that separates the luminous flux from the illumination optical system into red luminous flux, blue luminous flux, and green luminous flux;

a first display element that spatially modulates the red luminous flux that was separated by the color separation means to form red image light;

a second display element that spatially modulates the green luminous flux that was separated by the color separation means to form green image light;

a third display element that spatially modulates the blue luminous flux that was separated by the color separation means to form blue image light; and a projection lens that projects the red image light, green image light, and blue image light that were formed by the first to third display elements.

According to yet another aspect of the present invention, a projector system is provided that includes:

any of the above-described projectors;

a light source device that supplies each of red laser light, green laser light, and blue laser light;

a first optical fiber for conducting the green laser light and blue laser light that were supplied from the light source device to the projector; and a second optical fiber for conducting the red laser light that was supplied from the light source device to the projector.

BRIEF DESCRIPTION OF THE DRAWINGS

FIG. 4 is a schematic view showing the configuration of a projector system that is provided with the illumination optical system of the present invention.

EXPLANATION OF REFERENCE NUMBERS 1, 2 lens
3 dichroic mirror
10 illumination optical system
101, 102 optical fiber

BEST MODE FOR CARRYING OUT THE INVENTION

Exemplary embodiments of the present invention are next described with reference to the accompanying drawings.

Figure 1:
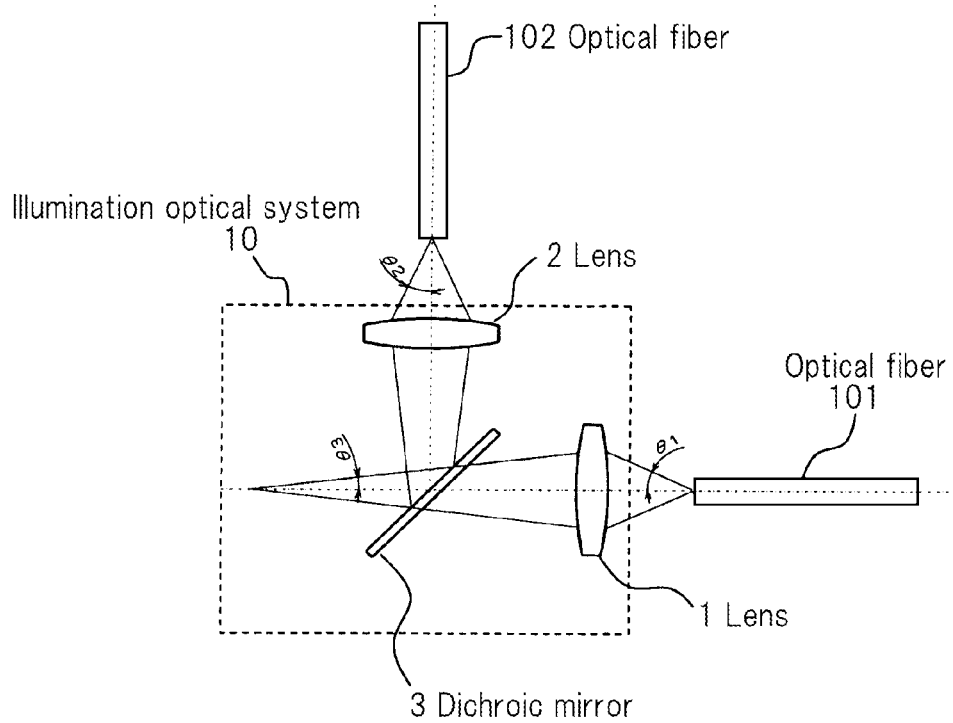
FIG. 1 is a schematic view showing the configuration of an illumination optical system that is an exemplary embodiment of the present invention.

FIG. 1 is a schematic view showing the configuration of an illumination optical system that is an exemplary embodiment of the present invention.

Referring to FIG. 1, illumination optical system 10 is a system used in a projector and includes lenses 1 and 2 and dichroic mirror 3.

Lens 1 condenses first luminous flux that is emitted from optical fiber 101 with a half-angle of divergence of $\theta1$. Lens 2 condenses second luminous flux that is emitted from optical fiber 102 with a half-angle of divergence of $\theta2$ ($\neq\theta1$) and that has a color that is different than the color of the first luminous flux.

Here, when viewed from a direction perpendicular to the plane that contains the center light ray (a light ray perpendicular to the exit surface) of divergent luminous flux that is exited from the exit surface of an optical fiber, the half-angle of divergence is the angle formed by an outermost light ray and the center light ray. Optical fibers 101 and 102 are of identical construction and each has the same NA (Numerical Aperture). However, the angle of divergence or the convergent angle of first luminous flux that is entered into optical fiber 101 differs from the angle of divergence or the convergent angle of the second luminous flux that is entered into optical fiber 102.

The optical axis of lens 1 is orthogonal or substantially orthogonal to the optical axis of lens 2, and dichroic mirror 3 is provided at the intersection of these optical axes. The first luminous flux from lens 1 is incident to one surface of dichroic mirror 3 at an angle of incidence of approximately 45 degrees. The second luminous flux from lens 2 is incident to the other surface of dichroic mirror 3 at an angle of incidence of approximately 45 degrees.

Dichroic mirror 3 is a synthesizing optical element that synthesizes the first luminous flux that was irradiated from lens 1 and the second luminous flux that was irradiated from lens 2 in one direction. More specifically, dichroic mirror 3 transmits the first luminous flux from lens 1 and reflects the second luminous flux from lens 2 in the direction in which the first luminous flux was transmitted.

For example, when the first luminous flux contains blue luminous flux and green luminous flux and the second luminous flux is red luminous flux, dichroic mirror 3 is made up of a reflective film having spectral reflection properties such that the red light is reflected and the green and blue light are transmitted. A reflective film having these spectral reflection properties can be formed by a multilayered dielectric film.

Lens 1 is configured such that the convergent half-angle of the condensed first luminous flux is $\theta3$. Lens 2 is also configured such that the convergent half-angle of the condensed second luminous flux is $\theta3$. Here, the convergent half-angle is the angle formed by an outermost light ray and the center light ray when the condensed luminous flux is viewed from a direction perpendicular to a plane that contains the center light ray.

More specifically, lenses 1 and 2 are formed to satisfy the conditions shown below.

When the magnification of lens 1 is $\beta1$, lens 1 is designed such that the following relation is satisfied:

$$\sin\theta1/\sin\theta3=\beta1$$

If the magnification of lens 2 is $\beta2$, lens 2 is designed such that the following relation is satisfied:

$$\sin\theta2/\sin\theta3=\beta2$$

According to the above-described illumination optical system 1, lens 1 condenses the first luminous flux having a half-angle of divergence of $\theta1$ that was emitted from optical fiber 101, and lens 2 condenses the second luminous flux having a half-angle of divergence of $\theta2$ ($\neq\theta1$) that was emitted from the optical fiber 102. The first luminous flux that was condensed by lens 1 and the second luminous flux that was condensed by lens 2 each converge at one point with a convergent half-angle of $\theta3$. Accordingly, if a rod integrator is arranged at the point of convergence of the first and second luminous flux, the first and second luminous flux will be incident to that rod integrator at the same convergent angle of $\theta3$. In this case, the degree of uniformity of luminance of the first and second luminous flux at the rod integrator will be substantially equal.

Lenses 1 and 2 are formed such that the convergent half-angle of the first luminous flux and the convergent half-angle of the second luminous flux match. "Matching" here refers not to absolute matching but rather allows, for example, manufacturing error. For example, the convergent angle of the first and second luminous flux can be interpreted as matching if this convergence is within the range of manufacturing error or within a range in which a viewer would not notice color irregularities caused by differences in the degree of uniformity of luminance.

Figure 2:
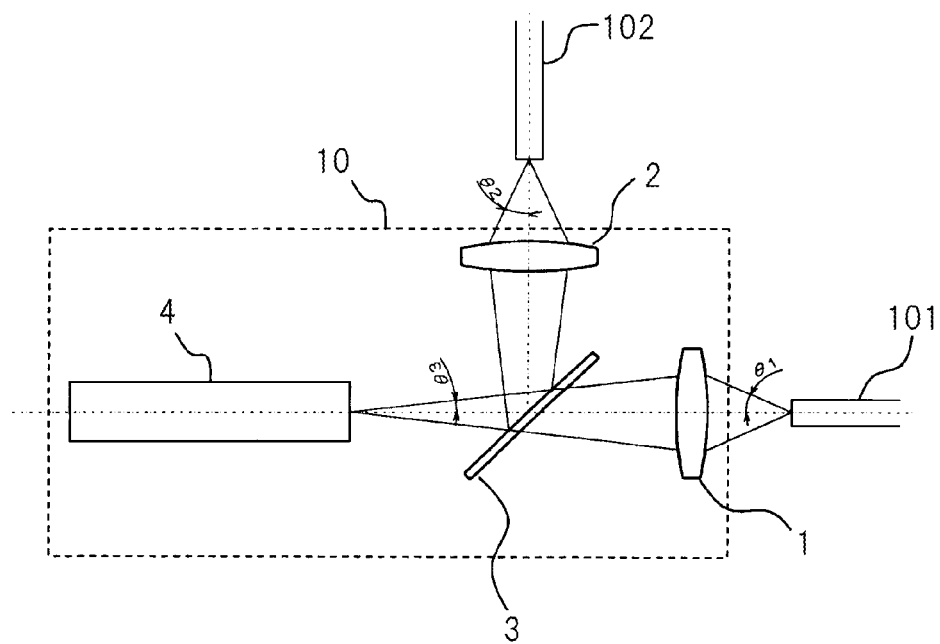
FIG. 2 is a schematic view showing the configuration of illumination optics that includes a rod integrator that is another exemplary embodiment of the present invention.

FIG. 2 shows illumination optics that includes a rod integrator.

Referring to FIG. 2, rod integrator 4 is composed of a column-shaped lens part, one of the two end surfaces of this lens part being the incident surface and the other end surface being the exit surface. More specifically, rod integrator 4 is composed of a quadrangular lens part of, for example, glass.

The center axis of rod integrator 4 coincides with the optical axis of lens 1. Lens 1 forms the image of the exit surface of optical fiber 101 on the incident surface of rod integrator 4, and lens 2 forms the image of the exit surface of optical fiber 102 on the incident surface of rod integrator 4. In other words, the incident surface of rod integrator 4 and the exit surface of each of optical fibers 101 and 102 are in a conjugate relation.

According to the configuration shown in FIG. 2, the first luminous flux having a half-angle of divergence of $\theta1$ from optical fiber 101 and the second luminous flux having a half-angle of divergence of $\theta2$ ($\neq\theta1$) from optical fiber 102 are irradiated into rod integrator 4 at the same convergent half-angle of $\theta3$, whereby the degree of uniformity of luminance in rod integrator 4 is substantially equal for the first luminous flux and the second luminous flux. As a result, color irregularities due to differences in the degree of uniformity of luminance do not occur.

In addition, the half-angles of divergence of the first and second luminous flux that are emitted from the rod integrator are the same. As a result, when the illumination optical system is made up of a lens group that includes, for example, a relay lens such that the image of the exit surface of rod integrator 4 is formed on the effective display region of the display element, the irradiation ranges of the first and second luminous flux on the display element substantially coincide. Thus, the appropriate setting of the magnification of the lens group can cause the irradiation ranges of the first and second luminous flux to substantially coincide with the effective display region of the display element.

A projector system provided with the illumination optical system of the present exemplary embodiment is next described.

Figure 3:
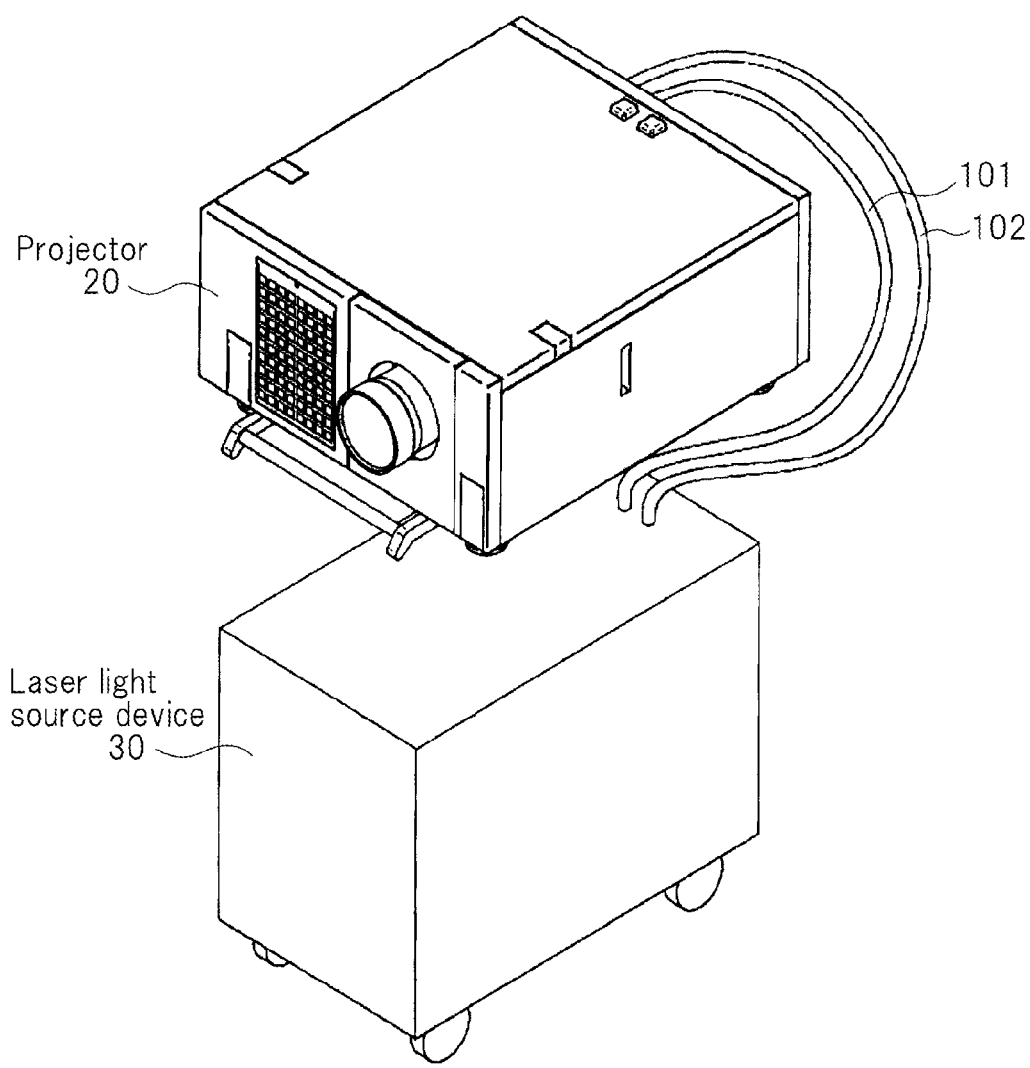
FIG. 3 is an external view of a projector system that is provided with the illumination optical system of the present invention.

FIG. 3 is an external view of a projector system provided with the illumination optical system of the present exemplary embodiment, and FIG. 4 is a schematic view showing the configuration of the projector system.

Referring to FIG. 3 and FIG. 4, the projector system includes projector main unit 20, laser light source device 30, and optical fibers 101 and 102 for supplying the laser light from laser light source device 30 to projector main unit 20.

Laser light source device 30 includes laser light sources 31 and 32. Laser light sources 31 and 32 are composed of, for example, semiconductor lasers.

Laser light source 31 includes a green laser light unit that supplies green laser light and a blue laser light unit that supplies blue laser light. The green and blue laser light that is emitted by laser light source 31 is supplied to projector main unit 20 by way of optical fiber 101. The angle of divergence of the laser light that is emitted by optical fiber 101 is substantially equal for green and blue.

Laser light source 32 includes a red laser light source unit that supplies red laser light. The red laser light that is emitted by laser light source 32 is supplied to projector main unit 20 by way of optical fiber 102. The angle of divergence of the red laser light that is emitted by optical fiber 102 differs from the angle of divergence of the green and blue laser light that is emitted by optical fiber 101.

Projector main unit 20 includes lenses 1 and 2, dichroic mirror 3, rod integrator 4, lens group 5, mirror 6, TIR prism 7, Philips prism 8, DMD 9, and projection lens 11.

Lenses 1 and 2, dichroic mirror 3, and rod integrator 4 are identical to the components shown in FIGS. 1 and 2.

The green and blue laser light emitted by optical fiber 101 is supplied to rod integrator 4 by way of lens 1 and dichroic mirror 3. The red laser light emitted by optical fiber 102 is supplied to rod integrator 4 by way of lens 2 and dichroic mirror 3.

The red, green, and blue laser light emitted from rod integrator 4 is irradiated upon DMD 9 by way of lens group 5, mirror 6, TIR prism 7, and Philips prism 8.

Lens group 5 is arranged at a position that faces the exit surface of rod integrator 4. The optical axis of lens 1, the optical axis of lens group 5, and the center axis of rod integrator 4 coincide. Lens group 5 includes a relay optical system and forms the image of the exit surface of rod integrator 4 on the display surface of DMD 9. In other words, the exit surface of rod integrator 4 and the display surface of DMD 9 are in a conjugate relation.

Mirror 6 reflects the red, green, and blue laser light emitted from lens group 5 toward TIR prism 7.

TIR prism 7 is made up of two triangular prisms 7a and 7b, a portion of the inclined surface of triangular prism 7a being bonded to the inclined surface of triangular prism 7b.

When viewed from the side surface of triangular prism 7a, triangular prism 7a is provided with two surfaces adjacent to the inclined surface, and the red, green, and blue laser light from mirror 6 is entered into the prism from one surface. The laser light that is entered into the prism undergoes total reflection in regions of the inclined surfaces other than the region that contacts the inclined surface of triangular prism 7b, and this reflected light exits from the other surface.

The red, green, and blue laser light that is emitted from the other surface of triangular prism 7a enters Philips prism 8.

In Philips prism 8, the laser light that is exited from the other surface of triangular prism 7a is separated into red, green, and blue luminous flux, and each of these colors is then emitted from a respective surface.

DMD 9 is the display element for green and is arranged to face the exit surface of the green luminous flux of Philips prism 8. Although not shown in FIG. 4, the display elements for each of red and blue are arranged to face the exit surface of red luminous flux and the exit surface of blue luminous flux, respectively, of Philips prism 8. The display elements for red and blue are here made up by DMDs.

DMD 9 for green spatially modulates the green luminous flux from Philips prism 8 to form green image light. The DMD for red spatially modulates the red luminous flux from Philips prism 8 to form red image light. The DMD for blue spatially modulates the blue luminous flux from Philips prism 8 to form blue image light.

The red, green and blue image light enters the other surface of triangular prism 7a of TIR prism 7 by way of Philips prism 8. Here, Philips prism 8 functions as a color-synthesizing element that synthesizes the red, green, and blue image light.

In triangular prism 7a, the irradiated red, green, and blue image light enters triangular prism 7b from, of the inclined surface of triangular prism 7a, the region that is covered by the inclined surface of triangular prism 7b.

When viewed from the side surface of triangular prism 7b, triangular prism 7b is provided with two surfaces that are adjacent to the inclined surface, and the red, green, and blue laser light that is entered from triangular prism 7a exits from one surface.

The image light (red+green+blue) that is exited from one surface of triangular prism 7b is projected onto a projection surface (not shown in the figure) by projection lens 11.

In the projector system described hereinabove, the illumination optical system is made up of lenses 1 and 2, dichroic mirror 3, rod integrator 4, and lens group 5. In this illumination optical system, the degree of uniformity of luminance in rod integrator 4 is substantially identical for the red laser light and the green and blue laser light, and color irregularities caused by differences in the degree of uniformity of luminance therefore do not occur.

In addition, the angle of divergence of each of the red, green, and blue laser light that is exited from rod integrator is substantially identical, whereby the irradiation range of the laser light of each color that is irradiated upon the DMD by lens group 5 also substantially coincides. By appropriately setting the magnification of lens group 5, the irradiation range on the DMD of the laser light of each color can be made to coincide with the effective display region. Decrease of the image quality can be thus reduced.

Laser light source 31 may include a plurality of green laser light sources and a plurality of blue laser light sources. In this case, optical fiber 101 includes a plurality of optical fibers corresponding to each of the plurality of green laser light sources and a plurality of optical fibers corresponding to each of the blue laser light sources.

Similarly, laser light source 32 may include a plurality of red laser light sources. In this case, optical fiber 102 includes a plurality of optical fibers corresponding to each of the plurality of red laser light sources.

For example, optical fiber 101 includes six optical fibers for blue and six optical fibers for green, and optical fiber 102 includes 12 optical fibers for red.

In the case described above, optical fibers for blue and green may be arranged in two horizontal rows at the incident surface or exit surface of optical fiber 101. Similarly, optical fibers for red may also be arranged in two horizontal rows at the incident surface or exit surface of optical fiber 102.

The half-angle of divergence of the luminous flux exited from each of the optical fibers for green and the optical fibers for blue is $\theta 1$, and the half-angle of divergence of luminous flux exited from optical fibers for red is $\theta 2$. The luminous flux having a half-angle of divergence of $\theta 1$ that is exited from each of the optical fibers for green and the optical fibers for blue is condensed at a convergent half-angle of $\theta 3$ by lens 1, and the luminous flux having a half-angle of divergence of $\theta 2$ that is exited from optical fibers for red is condensed at a convergent half-angle of $\theta 3$ by lens 2.

In optical fiber 101, the first row may be a row of optical fibers for blue, and the second row may be a row of optical fibers for green. Alternatively, the optical fibers for blue and the optical fibers for green may alternate or may be arranged in zigzag form.

By arranging the optical fibers for blue and the optical fibers for green in zigzag form, the blue luminous flux exited from each optical fiber for blue and the green luminous flux exited from each optical fiber for green can be considered to be a single luminous flux with a half-angle of divergence of $\theta 1$.

The projector system shown in FIG. 3 and FIG. 4 is of a three-panel configuration provided with three DMDs: a DMD for red, a DMD for green, and a DMD for blue. However, the present invention is not limited to this form. For example, the present invention may also be of a single-panel construction that forms red image light, green image light, and blue image light in time divisions by a single DMD.

A single-panel construction includes a construction in which a color wheel that separates the incident luminous flux into red luminous flux, green luminous flux, and blue luminous flux in time divisions is arranged on the incident surface side or exit surface side of rod integrator 4 in the configuration shown in FIG. 4. In this case, Philips prism 8 is unnecessary.

Alternatively, a reflective liquid crystal display device may be used in place of a DMD.

What is claimed is:

1. An illumination optical system comprising:
   a first lens that condenses a first luminous flux that is emitted from a first optical fiber with a first angle of divergence;
   a second lens that condenses second luminous flux that has a color that is different from a color of said first luminous flux and that is emitted from a second optical fiber with a second angle of divergence that differs from said first angle of divergence; and
   a synthesizing optical element that is provided at a position at which an optical axis of said first lens intersects with an optical axis of said second lens at a right angle, that transmits said first luminous flux from said first lens and that reflects said second luminous flux from said second lens in a direction in which said first luminous flux was transmitted;
   wherein said first and second lenses are configured such that a convergent angle of said first luminous flux that was condensed by said first lens coincides with a convergent angle of said second luminous flux that was condensed by said second lens,
   wherein said first lens is configured such that the following relation is satisfied:

$\sin \theta 1 / \sin \theta 3 = \beta 1$ and said second lens is configured such that the following relation is satisfied:

$\sin \theta 2 / \sin \theta 3 = \beta 2$ where $\beta 1$ and $\beta 2$ are the magnifications of said first and second lenses, respectively, $\theta 1$ and $\theta 2$ are said first and second angles of divergence, respectively, and the convergent angle of said first luminous flux that has been condensed by said first lens and the convergent angle of said second luminous flux that has been condensed by said second lens are both $\theta 3$.

2. An illumination optical system comprising:
   a first lens that condenses a first luminous flux that is emitted from a first optical fiber with a first angle of divergence;
   a second lens that condenses second luminous flux that has a color that is different from a color of said first luminous flux and that is emitted from a second optical fiber with a second angle of divergence that differs from said first angle of divergence;
   a synthesizing optical element that is provided at a position at which an optical axis of said first lens intersects with an optical axis of said second lens at a right angle, that transmits said first luminous flux from said first lens and that reflects said second luminous flux from said second lens in a direction in which said first luminous flux was transmitted,
   wherein said first and second lenses are configured such that a convergent angle of said first luminous flux that was condensed by said first lens coincides with a convergent angle of said second luminous flux that was condensed by said second lens; and
   a rod integrator that is provided with a columnar lens part, one of the two end surfaces of the lens part being an incident surface and the other end surface being an exit surface, said first and second luminous flux from said synthesizing optical element being entered from said incident surface, and the entered first and second luminous flux being propagated inside said lens part and then being exited from said exit surface;
   wherein said incident surface of said rod integrator and an exit surface of said first optical fiber are in a conjugate relation by way of said first lens; and
   said incident surface of said rod integrator and an exit surface of said second optical fiber are in a conjugate relation by way of said second lens.

3. The illumination optical system as set forth in claim 1, wherein said first luminous flux contains green laser light and blue laser light, and said second luminous flux contains red laser light.

4. A projector comprising:
   the illumination optical system as set forth in claim 1;
   a display unit that spatially modulates luminous flux from said illumination optical system to form image light; and a projection lens that projects said image light that was formed by said display unit.

5. A projector comprising:
the illumination optical system as set forth in claim 1;
a color separation unit that separates luminous flux from said illumination optical system into red luminous flux, blue luminous flux, and green luminous flux;
a first display element that spatially modulates said red luminous flux that was separated by said color separation unit to form red image light;
a second display element that spatially modulates said green luminous flux that was separated by said color separation unit to form green image light;
a third display element that spatially modulates said blue luminous flux that was separated by said color separation unit to form blue image light; and
a projection lens that projects said red image light, green image light, and blue image light that were formed by said first to third display elements.

6. A projector system comprising:
the projector as set forth in claim 4;
a light source device that supplies each of red laser light, green laser light, and blue laser light;
the first optical fiber for conducting said green laser light and blue laser light that were supplied from said light source device to said projector; and
the second optical fiber for conducting said red laser light that was supplied from said light source device to said projector.

7. A projector system comprising:
the projector as set forth in claim 5;
a light source device that supplies each of red laser light, green laser light, and blue laser light;
the first optical fiber for conducting said green laser light and blue laser light that were supplied from said light source device to said projector; and
the second optical fiber for conducting said red laser light that was supplied from said light source device to said projector.

8. A method of adjusting an angle of divergence of light from an illumination optical system that includes: a first lens that condenses a first luminous flux, that is emitted from a first optical fiber, with a first angle of divergence; a second lens that condenses second luminous flux, that has a color that is different from a color of said first luminous flux and that is emitted from a second optical fiber, with a second angle of divergence that differs from said first angle of divergence; and a synthesizing optical element that is provided at a position at which an optical axis of said first lens intersects an optical axis of said second lens at a right angle, that transmits said first luminous flux from said first lens and that reflects said second luminous flux from said second lens in a direction in which said first luminous flux was transmitted, wherein said first and second lenses are configured such that a convergent angle of said first luminous flux that was condensed by said first lens coincides with a convergent angle of said second luminous flux that was condensed by said second lens, said method comprising:
forming said first lens such that the following relation is satisfied:

$$\sin \theta_1 / \sin \theta_3 = \beta_1$$

and;
forming said second lens such that the following relation is satisfied:

$$\sin \theta_2 / \sin \theta_3 = \beta_2$$

where $\beta_1$ and $\beta_2$ are the magnifications of said first and second lenses, respectively, $\theta_1$ and $\theta_2$ are said first and second angles of divergence, respectively, and the convergent angle of said first luminous flux that has been condensed by said first lens and the convergent angle of said second luminous flux that has been condensed by said second lens are both $\theta_3$.

9. A method according to claim 8, further comprising:
providing a rod integrator with a columnar lens part, one of the two end surfaces of the lens part being an incident surface and the other end surface being an exit surface, said first and second luminous flux from said synthesizing optical element being entered from said incident surface, and the entered first and second luminous flux being propagated inside said lens part and then being exited from said exit surface;
wherein said incident surface of said rod integrator and an exit surface of said first optical fiber are in a conjugate relation by way of said first lens; and
said incident surface of said rod integrator and an exit surface of said second optical fiber are in a conjugate relation by way of said second lens.

10. A method according to claim 8, wherein said first luminous flux contains green laser light and blue laser light, and said second luminous flux contains red laser light.

* * * * *